(12) United States Patent
Rivier et al.

(10) Patent No.: US 12,533,475 B2
(45) Date of Patent: Jan. 27, 2026

(54) COVER FOR A MEDICAL INJECTION DEVICE COMPRISING A RADIO FREQUENCY IDENTIFICATION (RFID) TAG

(71) Applicants: Becton Dickinson France, Le Pont-de-Claix (FR); Becton, Dickinson and Company, Franklin Lakes, NJ (US)

(72) Inventors: Cédric Rivier, Voreppe (FR); Nicolas Euvrard, London (GB); Sébastien Jouffray, Saint Martin d'Uriage (FR); Alfred Leibbrand, Claix (FR)

(73) Assignees: Becton Dickinson France, Le Pont de Claix (FR); Becton, Dickinson and Company, Franklin Lakes, NJ (US)

( * ) Notice: Subject to any disclaimer, the term of this patent is extended or adjusted under 35 U.S.C. 154(b) by 686 days.

(21) Appl. No.: 17/926,049

(22) PCT Filed: Apr. 15, 2021

(86) PCT No.: PCT/EP2021/059839
§ 371 (c)(1),
(2) Date: Nov. 17, 2022

(87) PCT Pub. No.: WO2021/233613
PCT Pub. Date: Nov. 25, 2021

(65) Prior Publication Data
US 2023/0181841 A1    Jun. 15, 2023

(30) Foreign Application Priority Data

May 18, 2020   (EP) .................................... 20175263

(51) Int. Cl.
*A61M 5/32*    (2006.01)
*G06K 19/077*  (2006.01)
*A61B 90/98*   (2016.01)

(52) U.S. Cl.
CPC ........... *A61M 5/3202* (2013.01); *A61B 90/98* (2016.02); *A61M 2205/3569* (2013.01);
(Continued)

(58) Field of Classification Search
CPC ........ A61M 5/3202; A61M 2205/3569; A61M 2205/60; A61M 2205/6054;
(Continued)

(56) References Cited

U.S. PATENT DOCUMENTS 10,675,123 B2   6/2020   Bauss et al.
2004/0220602 A1* 11/2004  Deng ..................... A61B 90/98
                                              606/167
(Continued)

FOREIGN PATENT DOCUMENTS

CN    108257658 A    7/2018
EP    2605189 A2     9/2013
(Continued)

*Primary Examiner* — Tasnim Mehjabin Ahmed
(74) *Attorney, Agent, or Firm* — The Webb Law Firm (57) ABSTRACT

The present invention relates to a cover for medical injection device, said medical injection device having a hub portion defined at its distal end. The said cover includes: an outer casing formed of a first material, said outer casing having an inner wall having a circumference, an inner casing formed of a second material different from the said first material and defining a cavity capable of receiving in a sealing way at least part of the hub portion, said inner casing having an outer wall having a circumference, and being at least partly inserted within the outer casing and at least partially in contact with the inner wall of the outer casing, a Radio Frequency Identification RFID tag located between the outer casing and the inner casing, said RFID tag comprising a RFID chip connected to at least one RFID antenna, wherein the RFID tag has a width extending between 40% and 100%, 100% being excluded, of the circumference of the outer wall of the inner casing or the whole circumference of the inner (Continued)

wall of the outer casing and wherein the RFID tag has a length extending over at least 50% of a length of the cover. The invention also relates to a medical injection device including the said cover and a method for manufacturing said cover.

15 Claims, 6 Drawing Sheets

(52) U.S. Cl.
CPC . *A61M 2205/60* (2013.01); *A61M 2205/6054* (2013.01); *A61M 2207/10* (2013.01); *G06K 19/07758* (2013.01); *G06K 19/07786* (2013.01)

(58) Field of Classification Search
CPC ............... A61M 2207/10; A61B 90/98; G06K 19/07758; G06K 19/07786; B43K 23/08
See application file for complete search history.

(56) References Cited

U.S. PATENT DOCUMENTS

| | | |
|---|---|---|
| 2015/0080810 A1 | 3/2015 | Henderson et al. |
| 2019/0217018 A1* | 7/2019 | Bauss ................ A61M 5/3202 |
| 2019/0236428 A1 | 8/2019 | Robadey |
| 2022/0226572 A1 | 7/2022 | Rivier |

FOREIGN PATENT DOCUMENTS

| | | |
|---|---|---|
| EP | 2656865 A1 | 10/2013 |
| JP | 2019520178 A | 7/2019 |
| JP | 2019192084 A | 10/2019 |
| JP | 2020030703 A | 2/2020 |
| RU | 197124 U1 | 4/2020 |
| WO | 2017157784 A1 | 9/2017 |
| WO | 2019213385 A1 | 11/2019 |
| WO | 2020260297 A1 | 12/2020 |

\* cited by examiner

COVER FOR A MEDICAL INJECTION DEVICE COMPRISING A RADIO FREQUENCY IDENTIFICATION (RFID) TAG

CROSS-REFERENCE TO RELATED APPLICATIONS

This application is the United States national phase of International Application No. PCT/EP2021/059839 filed Apr. 15, 2021, and claims priority to European Patent Application No. 20175263.1 filed May 18, 2020, the disclosures of which are hereby incorporated by reference in their entirety.

BACKGROUND OF THE INVENTION

Field of the Invention

The present invention relates to a cover for a medical injection device, a medical injection device and a method for manufacturing said cover. The invention is particularly well suited for the healthcare industry.

Description of Related Art

In this application, the distal end of a component or of a device is to be understood as meaning the end furthest from the user's hand and the proximal end is to be understood as meaning the end closest to the user's hand. Likewise, in this application, the "distal direction" is to be understood as meaning the direction of injection, with respect to a medical container of the invention, and the "proximal direction" is to be understood as meaning the opposite direction to said direction of injection, that is to say the direction towards the user's hand holding a container as for an injection operation.

Medical injection devices, for example pre-fillable or prefilled syringes, usually comprise a hollow body or barrel forming a container for a medical product. This body comprises a distal end, optionally provided with a needle, and a proximal end, usually provided with a flange.

SUMMARY OF THE INVENTION

There is an increasing need for individual traceability of the medical containers, such as medical injection devices, from the manufacturing process until the final labeling, the final use or the disposal of said medical containers.

It is known, for example, from WO2017157784, a receptacle having a cylindrical lateral surface surrounded by a sequence of printed machine-readable unique identifier codes. These printed unique identifier codes allow tracking and tracing of each receptacle along a supply chain. However, these unique identifier codes are printed on an external side of the receptacle so that they may be removed or damaged, for example, during handling or use of the receptacle. Moreover, the unique identifier codes cover a portion of the receptacle so that they may have an impact on a user visual inspection process. Finally, an inkjet printer is used to print the identifier codes on the external side of the receptacle. However, this printing method, using ink, may lead to a risk of contamination of the receptacle. Moreover, one may not have access to these printed unique identifier codes when the receptacle is put, for example, in a sealed packaging.

It is further known from EP2019305879, a plastic flange for a medical container, said flange comprising a remotely readable electronic component such as RFID tag including a RFID chip and a RFID antenna for remote identification of the medical container. However said medical container requires a complex manufacturing process which includes in particular the assembly of a plastic flange on a glass barrel.

US2019/0217018 discloses a RFID tag enabled shield assembly that provides a sterile enclosure of a medicament delivery port of a medicament container. The container can be a needleless pre-filled syringe, a vial, a cartridge, or a collapsible bag or pouch. The RFID tag is fixedly attached to one or more components of the shield assembly through co-molding or another form of permanent or removable attachment. The RFID tag is actually a RFID chip that can be optionally in electrical communication with an antenna. In all the embodiments disclosed, it is clear that the dimension of the RFID tag is the smallest possible. Indeed, a small RFID tag is easier to implement without affecting the cover manufacturing process. Furthermore, a small RFID tag barely affects the thickness and the visual aspect of the shield assembly. Nevertheless, the data transmission level to the RFID reader is significantly reduced.

In this context, an object of the present invention is to provide a device that alleviates the above-mentioned drawbacks by allowing an effective individual identification of a medical injection device with few or no impact on visual inspection, with a high data transmission level, with few or no risks of being removed or damaged, and with a limited impact on the manufacturing process.

A first aspect of the present invention is a cover for a medical injection device, said medical injection device having a hub portion defined at its distal end, the said cover comprising:

an outer casing formed of a first material, said outer casing having an inner wall having a circumference, an inner casing formed of a second material different from the said first material and defining a cavity capable of receiving in a sealing way at least part of the hub portion, said inner casing having an outer wall having a circumference, and being at least partly inserted within the outer casing and at least partially in contact with the inner wall of the outer casing, a Radio Frequency Identification RFID tag located between the outer casing and the inner casing, said RFID tag comprising a RFID chip connected to at least one RFID antenna, wherein the RFID tag has a width extending between 40% and 100%, 100% being excluded, of the circumference of the outer wall of the inner casing or the whole circumference of the inner wall of the outer casing and wherein the RFID tag has a length extending over at least 50% of a length of the cover.

Without willing to be bound by any theory, it is believed that the cover of the invention allows individual traceability of each medical injection device from the manufacturing process to the final use of the medical injection device. Besides, the RFID tag is well protected from removal or external damage that may occur due to the packaging, storing distribution or the use of the medical injection device. Furthermore, the RFID tag being concealed between the outer casing and the inner casing of the cover, there is no visual impact on the medical injection device. Additionally, the insertion of the RFID tag has only a limited impact on the cover manufacturing process. It is also contemplated that the RFID tag allows remote and therefore easy identification of the medical injection device, from the manufacturing steps of the cover to the final use of the medical injection device or its disposal. Another advantage of the invention is that the RFID tag does not require a direct visual perspective from a reading machine so that the reading may occur at any time without a need to unpack the medical injection device, the medical injection device being packed in an individual packaging or packed with others medical injection devices such as in a tub and/or a sealing bag. Moreover, the RFID tag being integrated within the cover, there is no additional thickness to an outer wall of the cover, and thus no change is required regarding the packaging or storing of the medical injection device. Finally, the RFID tag has a width extending between 40% and 100%, 100% being excluded, of the circumference of the outer wall of the inner casing or the whole circumference of the inner wall of the outer casing. It is believed that if the RFID tag overlaps the circumference of the outer wall of the inner casing or the whole circumference of the inner wall of the outer casing, there is a risk to decrease the data transmission level to the RFID reader. The RFID tag has a length extending over at least 50% of a length of the cover. It is believed that the length of the tag, and more particularly the length of the antenna of the tag, can have an impact on the data transmission level of the RFID tag to the RFID reader. In contrast to the prior art, the inventors have discovered that it is possible to implement the RFID tag according to the present invention having a wide width and a wide length in the cover. Indeed, the location of the RFID tag in the cover, and more particularly between the outer casing and the inner casing allows increasing the dimensions of the RFID tag and therefore the data transmission level to the RFID reader significantly increases without affecting the manufacturing process.

In the present application, 100% of the width of the cover corresponds to the maximum width of the cover and 100% of the length of the cover corresponds to the maximum length of the cover.

The cover of the present invention comprises an inner casing having an outer wall being at least partly in contact with the inner wall of the outer casing. The contact is made without any adhesive. Preferably, the outer wall of the inner casing is only partly in contact with the inner wall of the outer casing. In this embodiment, the inner and outer casings can be easily assembled together.

In one embodiment, the RFID tag comprises a RFID chip connected to at least one RFID antenna extending substantially along a longitudinal axis of the cover.

In one embodiment, the RFID tag is positioned within the inner wall of the outer casing.

In another embodiment, the RFID tag is positioned within the outer wall of the inner casing.

In another embodiment, the RFID tag is positioned between the outer wall of the inner casing and the inner wall of the outer casing. For example the RFID tag may adhere to the outer wall of the inner casing by adhesive bonding, or the RFID tag may adhere to the inner wall of the outer casing by adhesive bonding.

In one embodiment, the RFID tag is in a form of wet inlay, dry inlay, or pressure sensitive label.

RFID Wet Inlays and RFID Dry Inlays can comprise a substrate, for example made of paper or Polyethylene terephthalate (PET). The RFID tag can be disposed on one side of the substrate. RFID Wet Inlays and RFID Dry Inlays can further comprise at least one protective layer on top of the RFID tag. The protective layer can be a siliconized paper.

RFID Wet Inlays are described as "wet" as they include an adhesive layer on the other side of the substrate and a backing paper, for example with a silicon liner. RFID Dry Inlays are described as "Dry" due to their lack of adhesive backing. Pressure-sensitive labels are analogous to a high-tech sticker.

In one embodiment, the ring-shaped RFID tag is a Low Frequency Radio Frequency Identification (LF-RFID) tag. Low frequencies are usually about 30 KHz to 300 KHz. In this embodiment, a RFID reader can for example read the HF-RFID tag at a distance up to about ten cm.

In one embodiment, the RFID tag is a High Frequency Radio Frequency Identification (HF-RFID) tag. High frequencies are usually about 1-15 MHz. In this embodiment, a RFID reader can for example read the HF-RFID tag at a distance about one meter.

In one embodiment, the ring-shaped RFID tag is a High-Frequency Near Field Communication (HF-NFC) tag. The frequencies are usually about 13.56 MHz. In this embodiment, a NFC reader can for example read the HF-NFC tag at a distance up to a few centimeters. HF-NFC differs from HF-RFID in that it can be read by a NFC smartphone. In one embodiment, the ring-shaped RFID tag is a double frequency tag including simultaneously a HF-NFC and an UHF RFID. For example, it can be read with both a NFC smartphone or an UHF reader.

Preferably, the RFID tag is an Ultra High Frequency Radio Frequency Identification (UHF-RFID) tag. Ultra high frequencies are usually about 400-1000 MHz. In this embodiment, a RFID reader can for example read the UHF-RFID tag at a distance about fifteen meters.

Preferably, the RFID antenna has at least one leg. The RFID antenna may have two or four legs for example. More preferably, the RFID antenna has two legs, each leg having an extremity. For example, the RFID antenna has two legs which may have a plurality of steady steps. According to the present invention, steady step means that the two legs of the RFID antenna may have a plurality of even steps. For example, the steady step forms a square, rectangle, triangle or wave shape. Preferably, the plurality of steady steps have the same amplitude.

For example, the RFID antenna has two sinusoidal shaped legs, straight-shaped legs or coil-shaped legs. Preferably, when the RFID antenna has two sinusoidal shaped legs, both legs of the RFID antenna being made of a plurality of sinusoids. For example, when the RFID tag is an UHF-RFID tag, the two legs have sinusoidal shape. For example, when the RFID tag is a HF-RFID tag, the two legs have a coil shape. Indeed, it is believed that in these embodiments, the shape of the legs further improves the communication between the chip, the antenna of the RFID tag and the RFID reader.

Preferably, the RFID antenna forms a loop between the legs, the RFID chip being located between the loop and the legs of the RFID antenna.

In one embodiment, the RFID tag is dissymmetrical, i.e. the RFID chip is not located at equidistance of both RFID antenna extremities.

Preferably, the RFID chip is located at equidistance of both RFID antenna extremities.

Preferably, the RFID tag has a width extending between 50% and 100% and more preferably between 50 and 90%, or advantageously between 40% and 90% of the circumference of the outer wall of the inner casing or the circumference of the inner wall of the outer casing. In this embodiment, it is believed that the data transmission level to the RFID reader is improved without any risk of interference.

Advantageously, the RFID tag has a length extending strictly less than 100% of a length of the cover. Preferably, the RFID tag has a length extending over at least 70% of a length of the cover. In this embodiment, it is believed that the length of the tag has a significant impact on the data transmission level of the RFID tag to the RFID reader.

Preferably, the radius of curvature of the RFID tag is between the radius of curvature of the outer casing and the radius of curvature of the inner casing.

Preferably, the RFID tag has a longitudinal axis parallel to a longitudinal axis of the cover.

Preferably, the first material is preferably more rigid than the said second material.

Preferably, the first material is a thermoplastic. The first material may be polypropylene (PP), polyethylene (PE), polyethylene terephthalate (PET), polystyrene (PS) or polycarbonate (PC).

Preferably, the second material is a deformable material, made of a material having elastomeric properties, such as Thermo Plastic Elastomer ("TPE"), rubber or elastomer. Materials with elastomeric properties that are sterilizable are preferred.

A second aspect of the present invention is a medical injection device comprising a hub portion and a cover according to the present invention. Advantageously the hub portion of the medical injection device of the invention comprises a needle.

A third aspect of the present invention is a method for manufacturing a cover according to the present invention, said method comprising:
 A. Providing an inner casing having an outer wall and an outer casing having an inner wall, said inner casing defining a cavity for receiving in a sealing way at least part of a hub portion defined at the distal end of a medical injection device and
 B. Positioning a RFID tag between the outer wall of the inner casing and the inner wall of the outer casing.

In step A), the inner casing and the outer casing may be manufactured separately or together. For example, the inner casing and the outer casing can be manufactured together by co-molding or over-molding. For example, the inner casing and the outer casing can be manufactured separately by molding, in particular by injection molding.

Preferably, in step B), the RFID tag is fixed within the inner wall of the outer casing, within the outer wall of the inner casing or between the outer wall of the inner casing and the inner wall of the outer casing by molding, by in-mold labelling, by adhesive bonding, by assembly, by co-molding or by over-molding.

Preferably, the RFID tag is fixed within the inner wall of the outer casing by in-mold labelling. Preferably, the RFID tag is fixed within the outer wall of the inner casing by in-mold labelling or adhesive bonding. For example, when the second material of the inner casing is a TPE, the RFID tag is fixed within the outer wall of the inner casing by in-mold labelling. For example, when the second material of the inner casing is a rubber, the RFID tag is fixed within the outer wall of the inner casing by adhesive bonding. Preferably, the RFID tag is fixed between the outer wall of the inner casing and the inner wall of the outer casing by adhesive bonding or by assembly. Assembly means that the RFID tag is held between the outer wall of the inner casing and the inner wall of the outer casing since the inner casing has an outer wall being at least partly in contact with the inner wall of the outer casing. Preferably, a RFID Dry inlay is fixed within the inner wall of the outer casing, within the outer wall of the inner casing or between the outer wall of the inner casing and the inner wall of the outer casing by in-mold labelling or over-molding.

Preferably, a RFID Wet inlay is fixed within the inner wall of the outer casing, within the outer wall of the inner casing or between the outer wall of the inner casing and the inner wall of the outer casing by in-mold labelling, by adhesive bonding, by assembly, by co-molding or by over-molding.

After step B), when the inner casing and the outer casing are manufactured separately, the inner casing and the outer casing can be assembled to form the cover of the invention.

BRIEF DESCRIPTION OF THE DRAWINGS

The invention and advantages arising therefrom will clearly emerge from the detailed description that is given below with reference to the appended drawings as follows.

DESCRIPTION OF THE INVENTION

Figure 1:
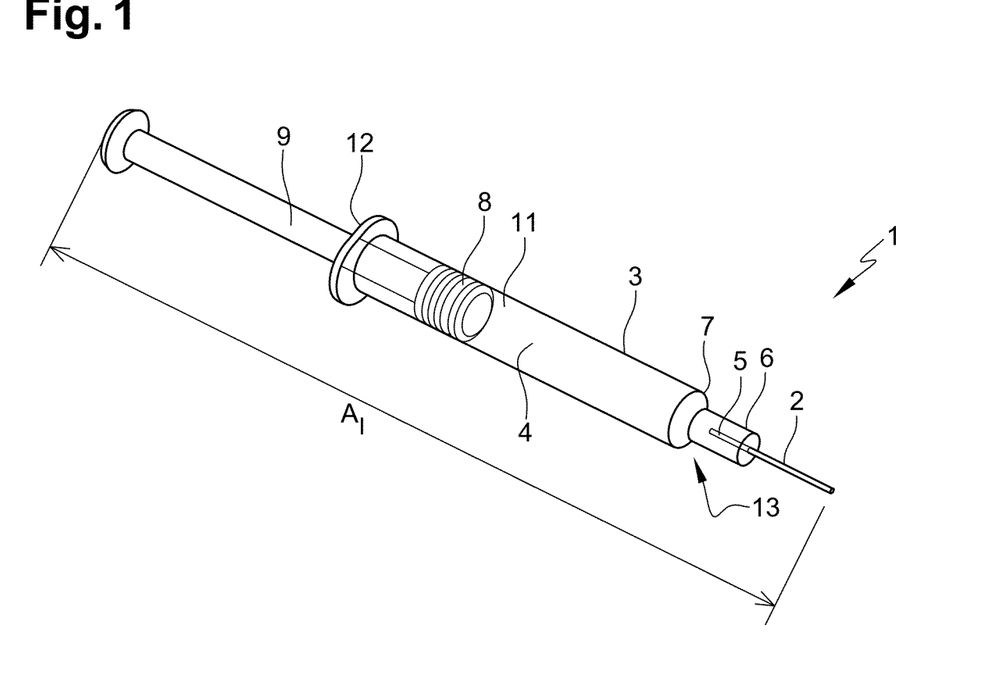
FIG. 1 is a transversal view of a medical injection device furnished with a needle intended to receive a cover according to the invention.

FIG. 1 shows a medical injection device 1 such as a syringe comprising a body 3 extending along a longitudinal axis $A_f$. Said body 3 comprises a sidewall 11 and thus forms a reservoir, adapted to contain a medical composition 4 to be injected.

The medical injection device 1 further comprises a hub portion 6 provided at its distal end 13 and extending along the axis $A_f$ from the distal end of the body 3. The hub portion 6 is partially hollow so as to form a channel 5 in fluidic communication with the body 3.

A needle 2 may be attached to the hub portion 6 of the medical injection device. For example, the needle 2 may be glued to the hub portion 6. The cover of the invention is intended to cover the hub portion 6 of the medical injection device, so as to protect the needle 2. The medical injection device 1 can also include, at its distal end, a distal shoulder 7 which narrows with respect to the body 3. At its proximal end the body can suitably include a body flange 12.

The medical injection device or syringe 1 shown in FIG. 1 also includes a plunger rod 9 having a stopper 8 provided at an end thereof. The stopper 8 is caused to slidably move in the body 3 along an inner surface of the sidewall 11 to cause the medical composition 4 to be expelled from the body 3 through the needle 2. The medical composition comprised in the medical injection device 1 may be for example, a liquid medicament, a drug or a pharmaceutical composition such as a vaccine.

Figure 2:
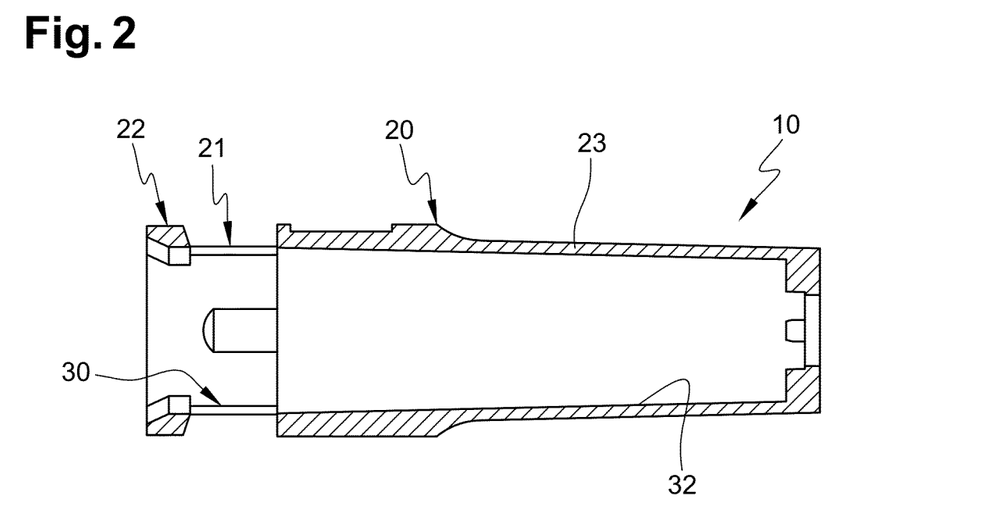
FIG. 2 is a cross-sectional view of on embodiment of the cover according to the present invention.
Figure 3:
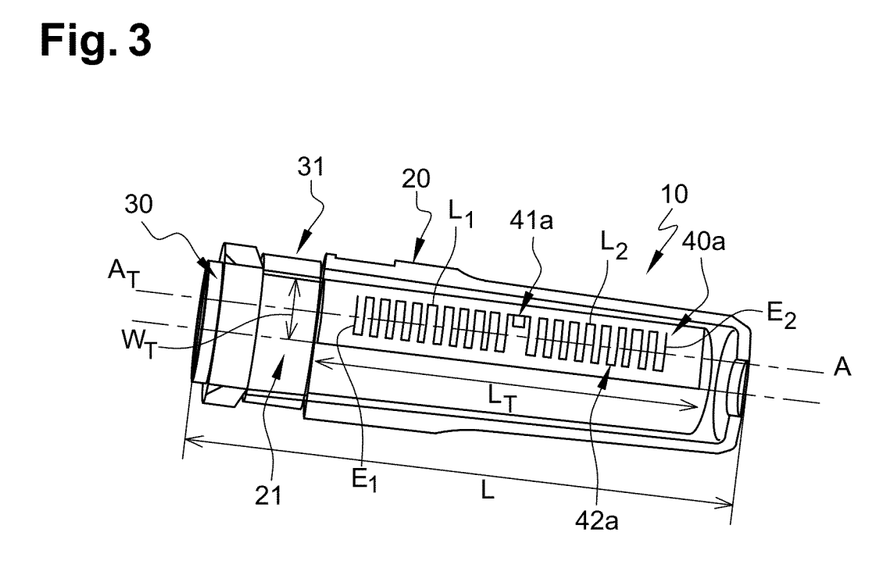
FIG. 3 is a perspective view of the embodiment illustrated in FIG. 2.

FIGS. 2 and 3 show a cover 10 according to an embodiment of the present invention. The cover 10 of the invention is intended to protect the needle 2 mounted on the hub portion 6 of a medical injection device 1. The cover 10 is intended to be mounted on the hub portion 6 of said medical injection device 1. The cover 10 comprises an outer casing 20 and an inner casing 30. The outer casing 20 is typically made of a rigid material while the inner casing 30—wherein the needle 2 is directly engaged when the cover 10 is mounted on the hub portion 6 of the medical injection device 1, is made of a soft material. Preferably, the outer casing 20 is made of polypropylene (PP), polyethylene (PE), polyethylene terephthalate (PET), polystyrene (PS) or polycarbonate (PC), much preferably of polypropylene. Advantageously, the inner casing 30 is made of a deformable material such as TPE (Thermo Plastic Elastomer). According to an embodiment, the outer casing 20 comprises a closed distal end and an opened proximal end. According to another embodiment, the inner casing 30 comprises a closed distal end and an opened proximal end. The outer casing 20 can be manufactured so that, at its proximal end, the outer casing 20 comprises at least one locking window 21. Said locking window define a through aperture and is configured to receive at least a radial lug 31 of the inner casing 30. Said radial lug 31 of the inner casing 30 engages with the at least one window 21 of the outer casing 20. Typically the outer casing comprises two locking windows 21 diametricaly opposite. Typically, the inner casing comprises two radial lugs 31 diametrically opposite. The outer casing 20 can comprise abutment portions 22 which are positioned next to locking window 21 allowing to lock the inner casing 20, as the radial lug 31 engages into the locking window 21. The outer casing 20 may be manufactured by over-molding or injection molding.

The outer casing 20 comprises an inner wall 23, which may receive an outer surface 32 of the inner casing 30. Both the inner wall 23 of the outer casing 20 and the outer wall of the inner casing 30 may have a circular cross section.

The inner casing 30 also comprises an inner wall (not shown) which is intended to cooperate with the hub portion 6 of the medical injection device 1 when the cover 10 is mounted on said hub portion 6. Said inner wall of the inner casing 30 is intended to sealingly engage an outer surface of the hub portion 6 of the medical injection device 1.

Figure 4:
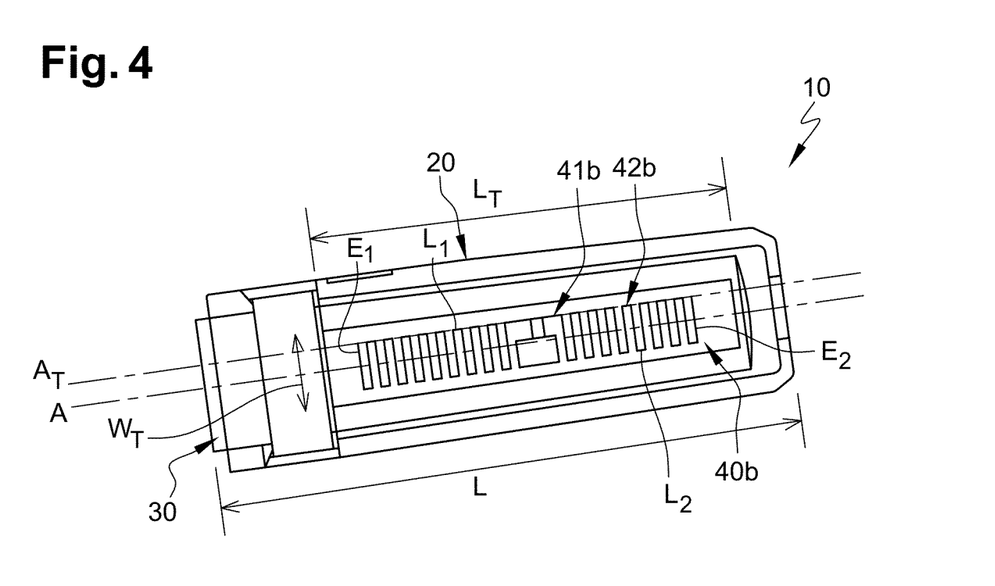
FIG. 4 is a perspective view of another embodiment of the cover according to the present invention.

As shown in FIGS. 3 and 4, a RFID tag 40*a*, 40*b* can be located between the outer wall 32 of the inner casing 30 and the inner wall 23 of the outer casing 20. Advantageously, said RFID tag 40*a*, 40*b* comprises a RFID chip 41*a*, 41*b* connected to at least one RFID antenna 42*a*, 42*b* extending substantially along a longitudinal axis A of the cover 10. When the cover 10 is mounted on the hub portion 6 of the medical injection device 1, the longitudinal axis A of the cover 10 is substantially parallel to the longitudinal axis $A_I$ of the medical injection device.

As shown in FIG. 3, the RFID tag 40*a* may be an UHF-RFID tag 40*a* comprising a RFID antenna 42*a* having two legs L1, L2. Leg L1 has an extremity E1, and leg L2 has an extremity E2. The RFID tag 40*a* is disposed between these two extremities E1, E2 of the legs L1, L2. The RFID chip 41*a* may be disposed at any place between the two extremities E1, E2, but at the extremities; or advantageously, the RFID chip 41*a* may be equidistant from both extremities E1, E2.

The RFID tag 40*a* may be shaped as a square, a rectangle or a circle, typically the RFID tag 40*a* is shaped as a square or a rectangle. When the RFID tag 40*a* is positioned within the outer wall 32 of the inner casing 30, the RFID tag 40*a* extends on less than 100%, 100% being excluded, of the whole circumference of the outer wall 32 of the inner casing 30. When the RFID tag 40*a* is positioned within the inner wall 23 of the outer casing 20, the RFID tag 40*a* extends on less than 100%, 100% being excluded, of the whole circumference of the inner wall 23 of the outer casing 20. When the RFID tag 40*a* is positioned between the outer wall 32 of the inner casing 30 and the inner wall 23 of the outer casing 20, the RFID tag 40*a* extends on less than 100%, 100% being excluded, of the whole circumference of the inner wall 23 of the outer casing 20. Preferably, two opposite sides of the RFID tag 40*a* are not in contact. Preferably, the RFID tag 40*a* has a width $W_T$ extending over at least 40% of the circumference of the outer wall 32 of the inner casing 30. More preferably, the RFID tag 40*a* has a width $W_T$ extending between 40% and 100%, 100% being excluded, preferably between 50% and 100% and more preferably between 50 and 90%, or advantageously between 40% and 90% of the circumference of the outer wall 32 of the inner casing 30. The RFID tag extends on the length L of the cover 10. The RFID tag 40*a* can have a length $L_T$ extending over at least 50%, typically at least 70% of a length L of the cover 10. Advantageously, the RFID tag 40*a* extends over the whole length L of the cover 10. This enables maximizing the exposition of the antenna to electromagnetic waves.

The radius of curvature of the RFID tag 40*a* is comprised between the radius of curvature of the inner casing and the radius of curvature of the outer casing.

The inventors have implemented a first RFID tag located between the outer wall of the inner casing as illustrated in FIG. 3. The RFID tag had a width $W_T$ extending over 63% of the circumference of the outer wall of the inner casing. The RFID tag had a length $L_T$ extending over 49% of a length L of the cover. In this example, the RFID tag had a read range of the data of 270 mm maximum when the RFID tag was read on the side and from below.

The inventors have implemented a second RFID tag located between the outer wall of the inner casing as illustrated in FIG. 3. The RFID tag had a width $W_T$ extending over 97% of the circumference of the outer wall of the inner casing. The RFID tag had a length $L_T$ extending over 74% of a length L of the cover. In this example, the RFID tag had a read range of the data of 430 mm maximum when the RFID tag was read on the side and a read range of the data of 700 mm maximum when the RFID tag was read from below.

Thus, the cover comprising the second RFID tag offers a data transmission level significantly higher than the cover comprising the first RFID tag. Additionally, the location of the RFID tag between the outer wall of the inner casing and the inner wall of the outer casing does not affect the cover manufacturing process and has a low impact on the visual inspection.

In the embodiment represented on FIG. 4, the RFID tag 40*b* is an UHF-RFID tag 40*b* comprising a RFID antenna 42*b* having two legs L1, L2. Leg L1 has an extremity E1, and leg L2 has an extremity E2. As represented on FIG. 4, the RFID antenna 42*b* forms a loop, and the UHF-RFID chip 41*b* is located at the junction of the two legs L1, L2 and the loop of the RFID antenna 42*b*. The loop can be used to capture the near frequency field while the legs can be used to capture the far frequency field.

The RFID tag 40*b* may be shaped as a square, a rectangle or a circle, typically the RFID tag 40*b* is shaped as a square or a rectangle. When the RFID tag 40*b* is positioned within the outer wall 32 of the inner casing 30, the RFID tag 40*b* extends on less than 100%, 100% being excluded, of the whole circumference of the outer wall 32 of the inner casing 30. When the RFID tag 40*b* is positioned within the inner wall 23 of the outer casing 20, the RFID tag 40*b* extends on less than 100%, 100% being excluded, of the whole circumference of the inner wall 23 of the outer casing 20. When the RFID tag 40b is positioned between the outer wall 32 of the inner casing 30 and the inner wall 23 of the outer casing 20, the RFID tag 40b extends on less than 100%, 100% being excluded, of the whole circumference of the inner wall 23 of the outer casing 20. Preferably, two opposite sides of the RFID tag 40b are not in contact. Preferably, the RFID tag 40b has a width $W_T$ extending over at least 40% of the circumference of the outer wall 32 of the inner casing 30. More preferably, the RFID tag 40b has a width $W_T$ extending between 40% and 100%, 100% being excluded, preferably between 50% and 100% and more preferably between 50 and 90%, or advantageously between 40% and 90% of the outer wall 32 of the inner casing 30. The RFID tag 40b extends on the length L of the cover 10. The RFID tag 40b can have a length $L_T$ extending over at least 50%, typically at least 70% of a length L of the cover 10. Advantageously, the RFID tag 40b extends over the whole length L of the cover 10. This enables maximizing the exposition of the antenna to electromagnetic waves.

In FIGS. 3 and 4, the RFID tag 40a, 40b, is disposed between the outer wall 32 of the inner casing 30 and the inner wall 23 of the outer casing 20. Said RFID tag 40a, 40b may be in a form of a dry inlay or a wet inlay. When the RFID tag 40a, 40b is in a form a wet inlay, the RFID tag is bonded to the inner casing by adhesive bonding. Otherwise, the RFID tag 40a, 40b may be fixed to the inner casing by in-mold labelling, by adhesive bonding, by assembly, by co-molding or by over-molding.

Figure 5:
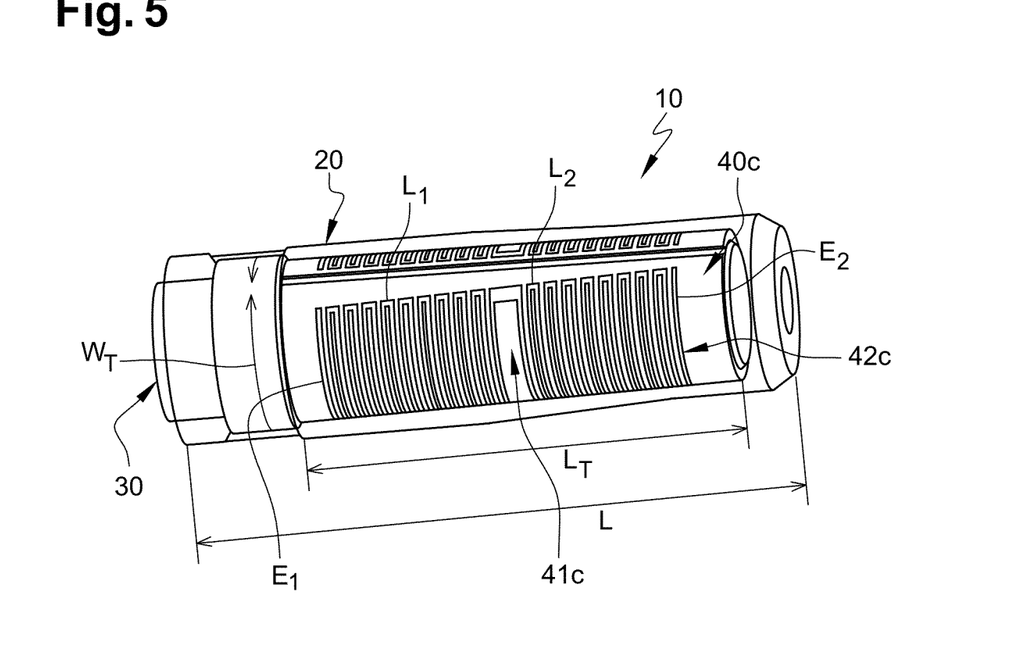
FIGS. 5 and 6 are perspective views of another embodiment of the cover according to the present invention.
Figure 6:
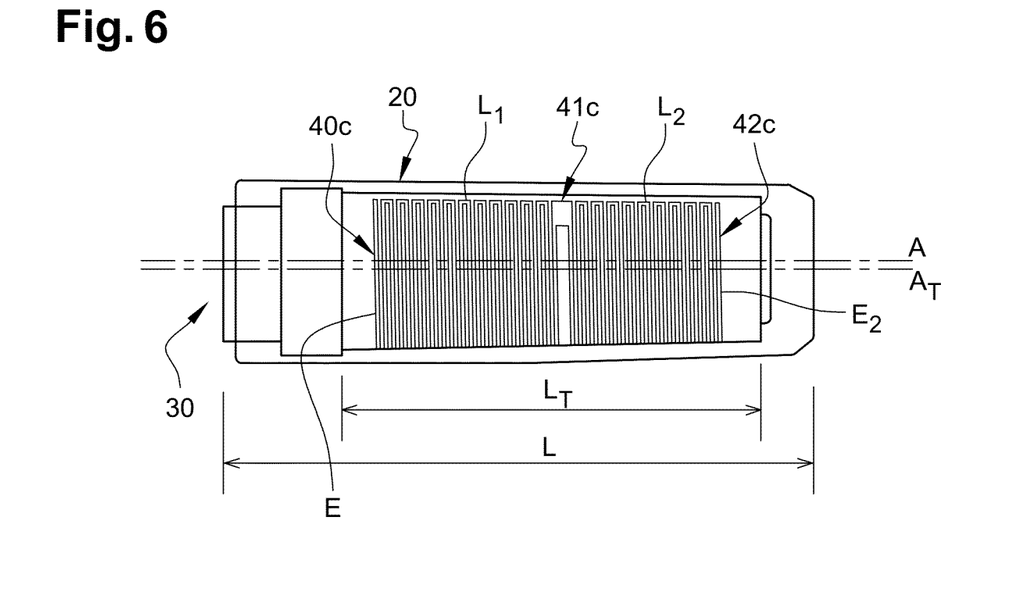

As shown in FIGS. 5 and 6, a RFID tag 40c can be located within the inner wall 23 of the outer casing 20, said UHF-RFID tag 40c comprising an UHF-RFID chip 41c connected to at least one UHF-RFID antenna 42c extending substantially along a longitudinal axis A of the cover 10.

The RFID tag 40c is an UHF-RFID tag 40c comprising a RFID antenna 42c having two legs L1, L2. Leg L1 has an extremity E1, and leg L2 has an extremity E2.

The RFID tag 40c may be shaped as a square, a rectangle or a circle, typically the RFID tag 40c is shaped as a square or a rectangle. When the RFID tag 40c is positioned within the outer wall 32 of the inner casing 30, the RFID tag 40c extends on less than 100%, 100% being excluded, of the whole circumference of the outer wall 32 of the inner casing 30. When the RFID tag 40c is positioned within the inner wall 23 of the outer casing 20, the RFID tag 40c extends on less than 100%, 100% being excluded, of the whole circumference of the inner wall 23 of the outer casing 20. When the RFID tag 40c is positioned between the outer wall 32 of the inner casing 30 and the inner wall 23 of the outer casing 20, the RFID tag 40c extends on less than 100%, 100% being excluded, of the whole circumference of the inner wall 23 of the outer casing 20. Preferably, two opposite sides of the RFID tag 40c are not in contact. Preferably, the RFID tag 40c have a width $W_T$ extending over at least 40% of the circumference of the outer wall 32 of the inner casing 30. More preferably, the RFID tag 40c have a width $W_T$ extending between 40% and 100%, 100% being excluded, advantageously between 50% and 100% and more preferably between 50 and 90%, or advantageously between 40% and 90% of the circumference of the outer wall 32 of the inner casing 30. The RFID tag extends on the length L of the cover 10. The RFID tag 40c can have a length $L_T$ extending over at least 50%, typically at least 70% of a length L of the cover 10. Advantageously, the RFID tag 40c extends over the whole length L of the cover 10. This enables maximizing the exposition of the antenna to electromagnetic waves.

FIG. 6 shows another view of the embodiment of FIG. 5.

In FIGS. 5 and 6, the RFID tag 40c, in a form of wet inlay, is disposed within the inner wall 23 of the outer casing 20 by for example adhesive bonding.

In all the Examples, the two legs L1, L2 of the RFID antenna 42a, 42b, 42c are made of a plurality of square-shaped sinusoids having the same amplitude. The RFID tag 40a, 40b, 40c can have a longitudinal axis A parallel to the longitudinal axis $A_T$ of the cover device.

Figure 7:
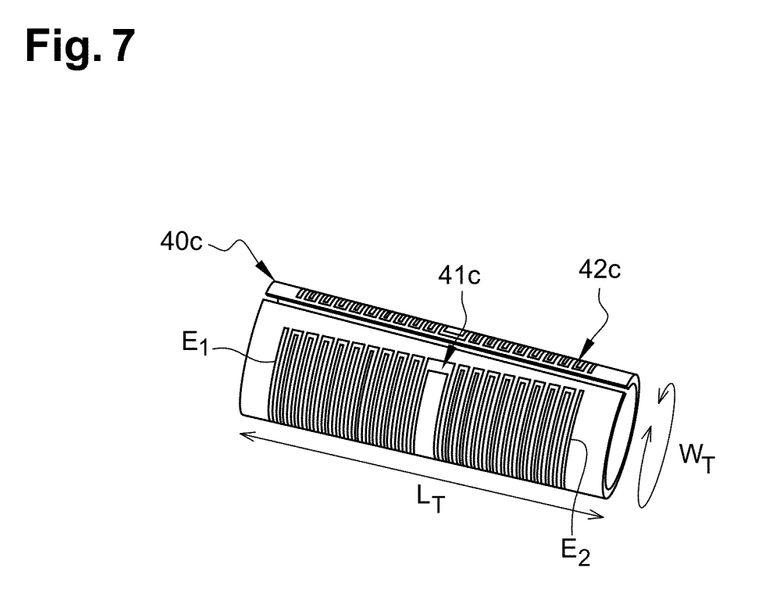
FIG. 7 is a perspective view of the embodiment illustrated in FIGS. 5 and 6.

FIG. 7 illustrates the RFID tag 40c according to the embodiment shown in FIGS. 5 and 6.

Figure 8:
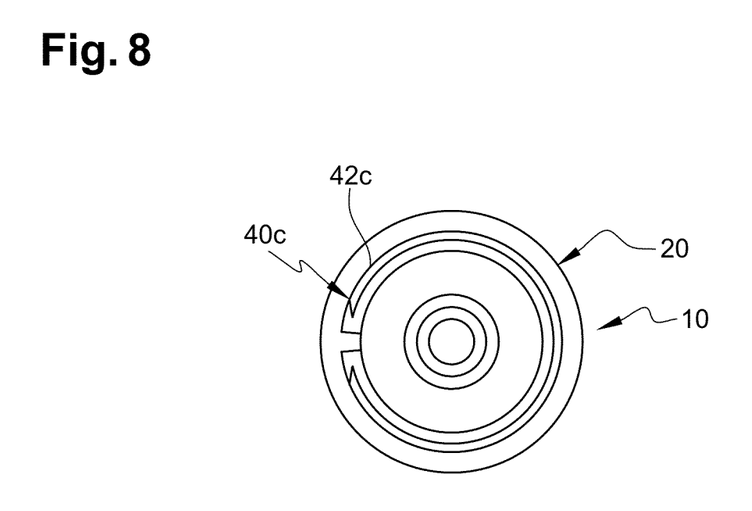
FIG. 8 is a cross sectional top view of the embodiment described in FIGS. 5 to 7.

FIG. 8 illustrates the cross sectional view of the cover 10 comprising the RFID tag 40c comprising the antenna 42c and the chip 41c.

Figure 9:
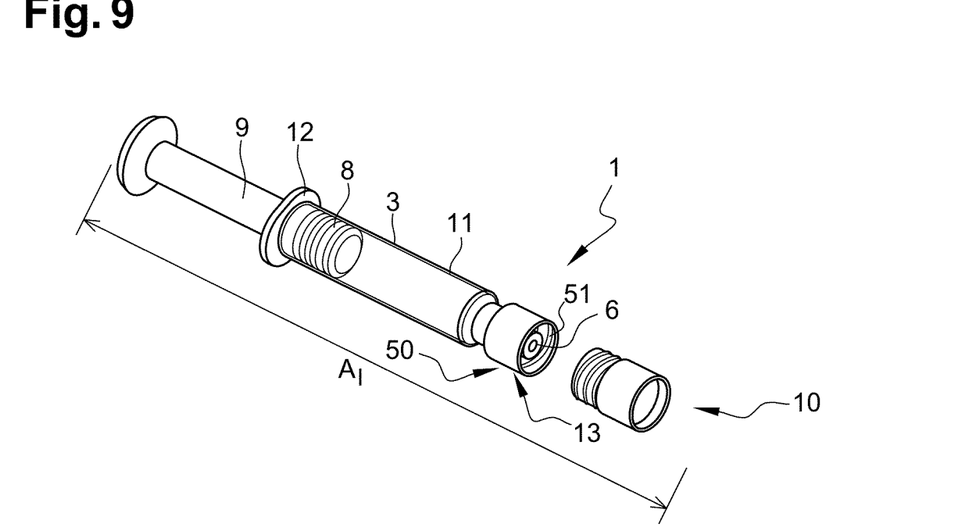
FIG. 9 is a transversal view of a medical injection device furnished with a needle intended to receive a cover according to the invention.

FIG. 9 shows a medical injection device 1 comprising a body 3 extending along a longitudinal axis $A_I$. Said body 3 comprises a sidewall 11 and thus forms a reservoir, adapted to contain a medical composition 4 to be injected.

The medical injection device 1 further comprises a hub portion 6 provided at its distal end 13 and extending along the axis $A_I$ from the distal end of the body 3. The hub portion 6 is partially hollow so as to form a channel (not illustrated) in fluidic communication with the body 3.

In the illustrated example, an adaptator 50 including an internal thread 51 may be mounted around the hub portion 6 of the medical injection device in such a way that an annular space is created between the adaptor 50 and the hub portion 6. The adaptator may be connected to the medical injection device by any suitable connecting means. The cover 10 of the invention is intended to cover the hub portion 6 of the medical injection device. The medical injection device 1 can also include, at its distal end, a distal shoulder which narrows with respect to the body 3.

The medical injection device or syringe 1 shown in FIG. 9 also includes a plunger rod 9 having a stopper 8 provided at an end thereof and a body flange 12. The stopper 8 is caused to slidably move in the body 3 along an inner surface of the sidewall 11 to cause the medical composition 4 to be expelled from the body 3 through the hub portion 6. The medical composition comprised in the medical injection device 1 may be for example, a liquid medicament, a drug or a pharmaceutical composition such as a vaccine.

Figure 10:
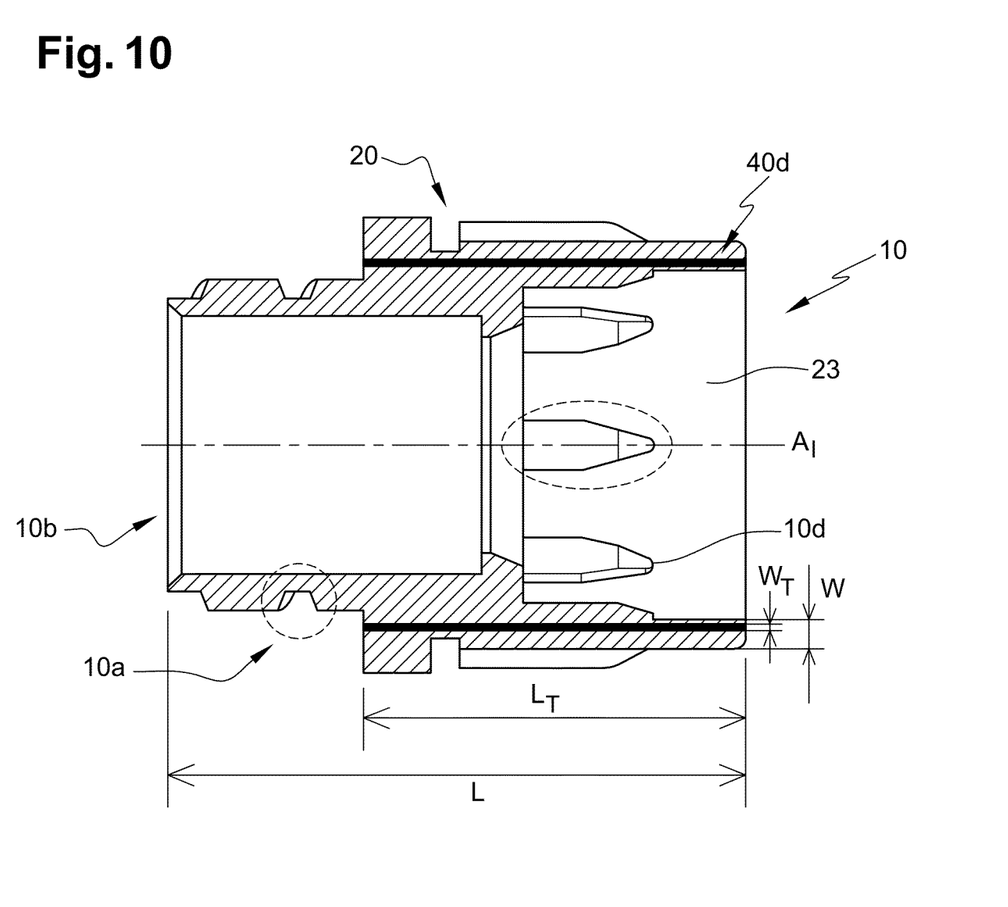
FIG. 10 is a cross-sectional view of the outer casing of the cover illustrated in FIG. 9
Figure 11:
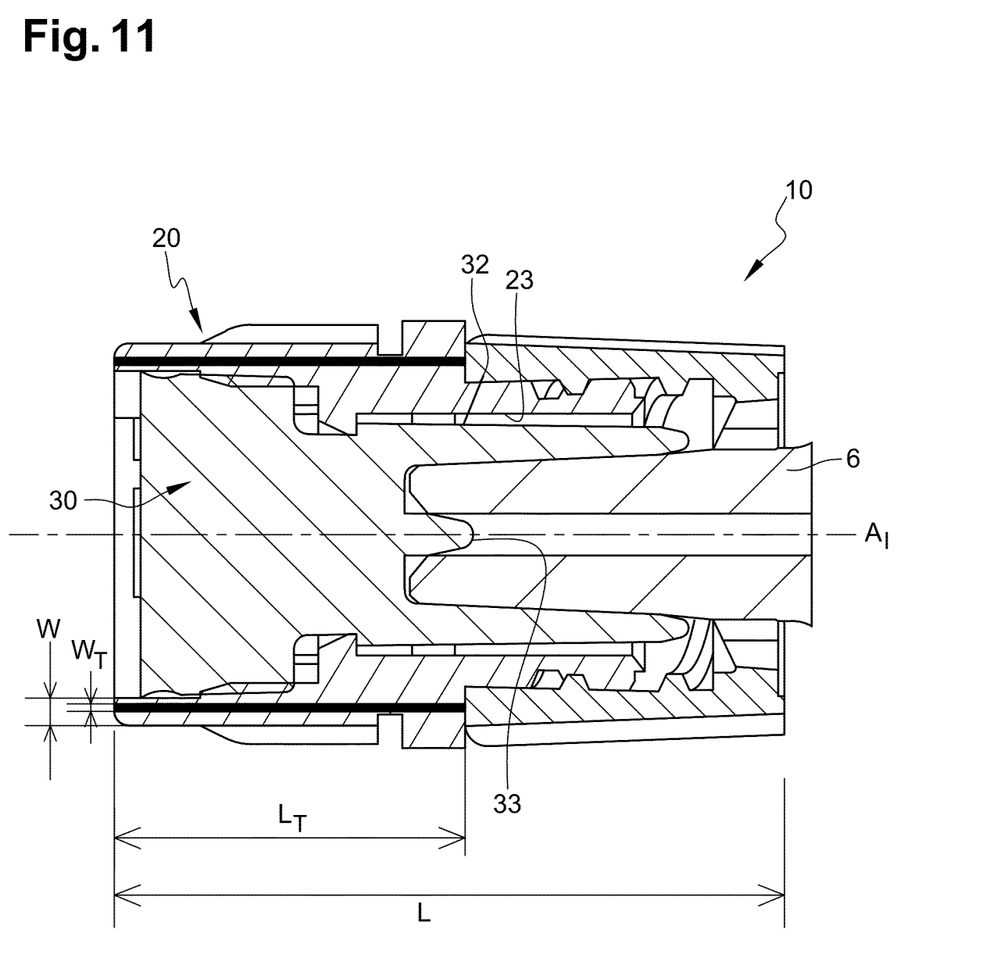
FIG. 11 is a cross-sectional view of the cover illustrated in FIG. 9.

As shown in FIGS. 9 to 11, the cover 10 comprises an outer casing 20 and an inner casing 30. The cover 10 can be manufactured for example by injection molding. According to an embodiment, the outer casing 20 comprises a opened distal end and an opened proximal end, and the inner casing 30 comprises a closed distal end and an opened proximal end. At its distal end, the outer casing 20 comprises reinforcement means 10d increasing the rigidity of the cover 10 and at its proximal end, the outer casing 20 comprises an external thread 10a configured to be screwed into the internal thread 51 of the adaptator 50. The outer casing 20 comprises, at its proximal end, a proximal opening 10b configured to receive the inner casing 30, said inner casing 30 defining, at its proximal end, a cavity capable of receiving in a sealing way the hub portion 6. The inner casing 30 can comprise a nipple 33 configured to ensure a tight and sterile seal of the distal hub 6 on the medical injection device 1.

Both the inner wall 23 of the outer casing 20 and the outer wall 32 of the inner casing 30 may have a circular cross section. The inner casing 30 is intended to cooperate with the hub portion 6 of the medical injection device 1 when the cover 10 is mounted on said hub portion 6. The inner casing 30 is intended to sealingly engage an outer surface of the hub portion 6 of the medical injection device 1.

As shown in FIGS. 10 and 11, a RFID tag 40d can be located within the inner wall 23 of the outer casing 20, said RFID tag 40d comprising an RFID chip connected to at least one RFID antenna extending substantially along a longitudinal axis $A_I$ of the cover 10. The RFID tag 40d may be a LF-RFID tag, a HF-RFID tag or a UHF-RFIF tag, or a HF-NFC RFID tag. In other embodiments, the RFID tag 40d is positioned within the outer wall 32 of the inner casing 30 or between the outer wall 32 of the inner casing 30 and the inner wall 23 of the outer casing 20.

The RFID tag 40d may be shaped as a square, a rectangle or a circle, typically the RFID tag 40d is shaped as a square or a rectangle. When the RFID tag 40d is positioned within the inner wall 23 of the outer casing 20, the RFID tag 40d extends on less than 100%, 100% being excluded, of the whole circumference of the inner wall 23 of the outer casing 20. Preferably, two opposite sides of the RFID tag 40d are not in contact. Preferably, the RFID tag 40d have a width $W_T$ extending at least over 40%, 100% being excluded, of the circumference of the inner wall 23 of the outer casing 20. More preferably, the RFID tag 40d has a width $W_T$ extending between 40% and 100%, preferably between 50% and 100% and more preferably between 50 and 90%, or advantageously between 40% and 90% of the inner wall 23 of the outer casing 20. The RFID tag extends on the length L of the cover 10. The RFID tag 40d can have a length $L_T$ extending over at least 50% of a length L of the cover 10. More preferably, the RFID tag 40d has a length $L_T$ extending over at least 70% of a length L of the cover 10. Advantageously, the RFID tag 40d extends over the whole length L of the cover 10. This enables maximizing the exposition of the antenna to electromagnetic waves of a reader.

The radius of curvature of the RFID tag 40d is comprised between the radius of curvature of the inner casing and the radius of curvature of the outer casing.

The RFID tag 40d may be in a form of a dry inlay or a wet inlay.

The cover according to the present invention allows a highly effective individual identification of a medical injection device with no impact on visual inspection, with few or no risks of being removed or damaged, and with a limited impact on the manufacturing process.

The invention claimed is:

1. A cover for a medical injection device, said medical injection device having a hub portion defined at its distal end, the said cover comprising: an outer casing formed of a first material, said outer casing having an inner wall having a circumference, an inner casing formed of a second material different from the said first material and defining a cavity capable of receiving in a sealing way at least part of the hub portion, said inner casing having an outer wall having a circumference, and being at least partly inserted within the outer casing and at least partially in contact with the inner wall of the outer casing, a Radio Frequency Identification RFID tag located between the outer casing and the inner casing, said RFID tag comprising a RFID chip connected to at least one RFID antenna, wherein the RFID tag has a width extending between 40% and 100%, 100% being excluded, of the circumference of the outer wall of the inner casing or the whole circumference of the inner wall of the outer casing and wherein the RFID tag has a length extending over at least 50% of a length of the cover.

2. The cover according to claim 1, wherein the RFID tag is positioned within the inner wall of the outer casing.

3. The cover according to claim 1, wherein the RFID tag is positioned within the outer wall of the inner casing.

4. The cover according to claim 1, wherein the RFID tag is positioned between the outer wall of the inner casing and the inner wall of the outer casing.

5. The cover according to claim 1, wherein the RFID tag is a Low Frequency Radio Frequency Identification LF-RFID tag, an Ultra High Frequency Radio Frequency Identification UHF-RFID tag, a High-Frequency Near Field Communication HF-NFC tag or a High Frequency Radio Frequency Identification HF-RFID tag.

6. The cover according to claim 1, wherein the RFID antenna has two legs, each leg having an extremity.

7. The cover according to claim 6, wherein each of the two legs of the RFID antenna are made of a plurality of steady steps.

8. The cover according to claim 7, wherein the plurality of steady steps of each leg have the same amplitude.

9. The cover according to claim 1, wherein the RFID tag has a width extending between 50% and 100% and more preferably between 50 and 90%, or advantageously between 40% and 90% of the circumference of the outer wall of the inner casing or the whole circumference of the inner wall of the outer casing.

10. The cover according to claim 1, wherein the RFID tag has a length extending over at least 70% of a length of the cover.

11. The cover according to claim 1, wherein the radius of curvature of the RFID tag is comprised between the radius of curvature of the outer casing and the radius of curvature of the inner casing.

12. The cover according to claim 1, wherein the RFID tag has a longitudinal axis parallel to a longitudinal axis of the cover.

13. A medical injection device comprising a hub portion, and a cover according to claim 1.

14. A method for manufacturing a cover according to claim 1, comprising: A. Providing the inner casing having the outer wall and the outer casing having the inner wall, said inner casing defining the cavity for receiving in a sealing way at least part of the hub portion defined at the distal end of the medical injection device and B. Positioning the RFID tag between the outer wall of the inner casing and the inner wall of the outer casing.

15. The method according to claim 14, wherein in step B), the RFID tag is fixed within the inner wall of the outer casing, within the outer wall of the inner casing or between the outer wall of the inner casing and the inner wall of the outer casing by molding, by in-mold labelling, by adhesive bonding, by assembly, by co-molding or by over-molding.

* * * * *